UNITED STATES PATENT OFFICE.

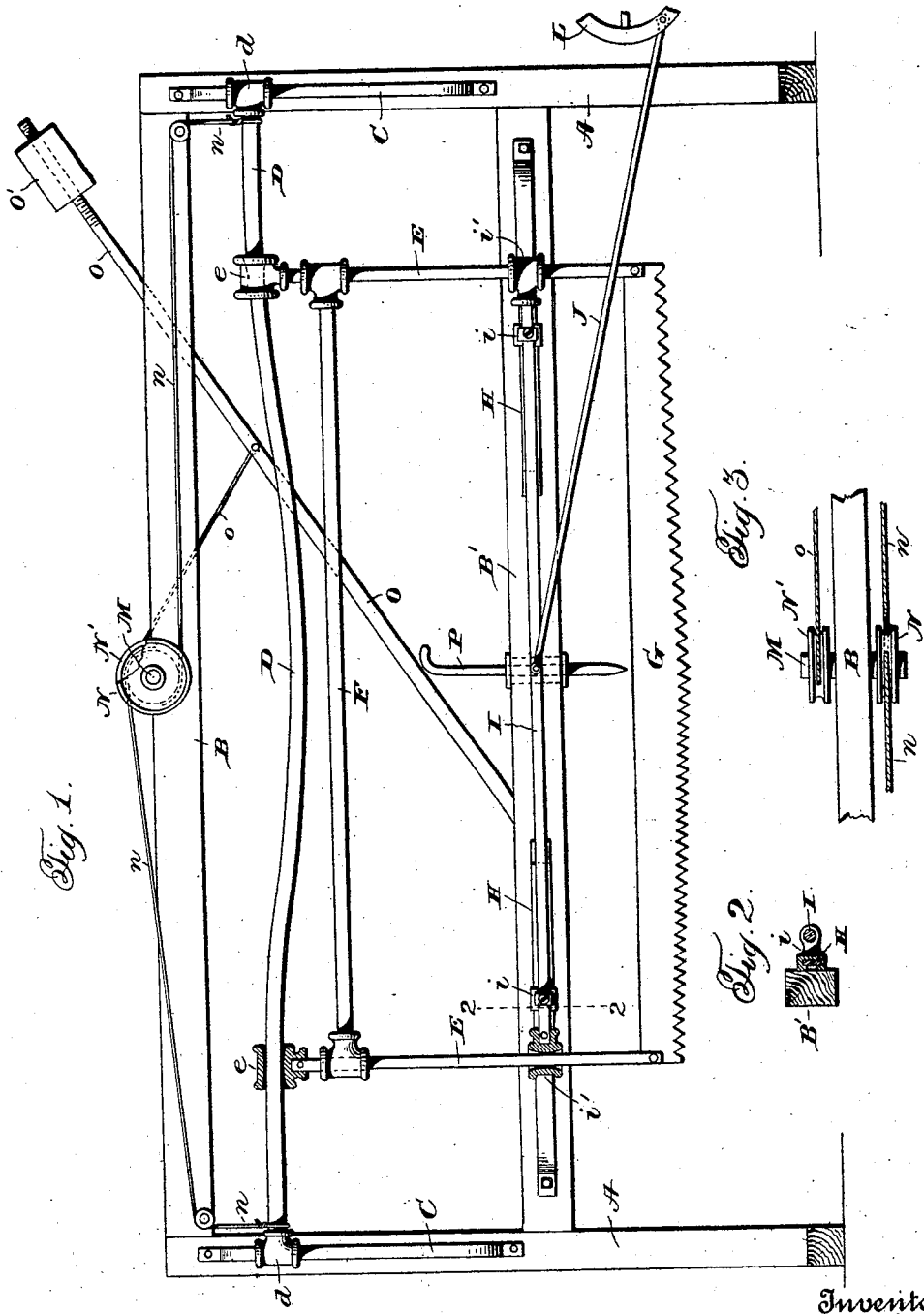

JAMES MATTHEW GALYAN AND JAMES MADISON CHESNUT, OF BLOOMINGTON, INDIANA.

SAW-MACHINE.

No. 859,211.     Specification of Letters Patent.     Patented July 9, 1907.

Application filed March 27, 1906. Serial No. 308,358.

*To all whom it may concern:*

Be it known that we, JAMES MATTHEW GALYAN and JAMES MADISON CHESNUT, citizens of the United States, residing at Bloomington, in the county of Monroe and State of Indiana, have invented certain new and useful Improvements in Saw-Machines, of which the following is a specification, reference being had therein to the accompanying drawing.

This invention relates to an improvement in saw machines and more particularly to those employing a reciprocating saw.

The object of the present invention is the provision in a machine of this character of means for causing the saw to travel in an arc during its reciprocatory movement.

A further object is the provision of means for effecting automatically the downward feed of the saw.

Other objects of the invention will be apparent from the detailed description hereinafter when read in connection with the accompanying drawings forming a part hereof, wherein a preferable embodiment of my invention is shown and wherein like numerals of reference refer to similar parts in the several views.

In the drawings, Figure 1 is a side elevation of my improved saw machine. Fig. 2 is a cross section on line 2—2 of Fig. 1, and Fig. 3 is a detail view.

Referring now more particularly to the drawings, the frame of my improved machine consists of the uprights A, A, which are mounted on suitable supports and are rigidly connected by the transverse beams B and B'.

C, C designate a pair of vertically disposed bars, which are secured by suitable brackets to one side of the supporting beams A, A.

D designates a guide bar for the saw frame, which extends transversely of the frame of the machine and is provided at the ends thereof with sleeves *d*, which are adapted to embrace the vertically disposed rods C, C so as to permit of the vertical movement of the guide bar thereon. The guide bar D is downwardly curved, for a purpose to be hereinafter more particularly set forth.

The saw frame comprises the vertically disposed side bars E, E, which are rigidly connected adjacent their upper ends by the cross bar F and between the lower ends of which is secured the saw G, which is provided with the usual curved toothed portion. The upper extremities of the side bars E, E of the saw frame are provided with sleeves *e, e*, which are adapted to loosely embrace the guide bar D, so as to permit the saw frame to move freely longitudinally thereon.

H, H designates a pair of horizontally disposed bars, which are connected by brackets, or in any other suitable manner, to one side of the transverse beam B' of the frame of the machine.

I designates a horizontally disposed bar, which is provided adjacent the ends thereof with clips *i*, which are adapted to loosely embrace the bars H, H. The extremities of the bar I are provided with vertically disposed sleeves *i'* which loosely embrace the side bars E, E of the saw frame. The upper and lower portions of the bore of the sleeves *i'* are enlarged or flared so as to permit the side bars E, E of the saw frame to have a slight rocking movement therein as well as a vertical movement therethrough. A reciprocatory movement is imparted to the saw frame by means of a pitman J, one end of which is secured to the bar I and the opposite end of which is secured to a fly wheel L, which may be driven from any suitable source of power.

M designates a shaft which extends transversely of and is secured by suitable bearings to the upper surface of the beam B of the frame of the machine.

N and N' designate a pair of pulleys secured to the shaft M. A pair of cables *n* are wound on the periphery of the pulley N and the ends of said cables extend tangentially from the periphery of said pulley in opposite directions and pass over idlers secured to the frame of the machine and are secured to the extremities of the guide bar D.

O designates a lever which is pivotally connected at its lower ends to any suitable part of the frame of the machine. A cable *o* is secured at one end to said lever and has its opposite end secured to and wound upon the periphery of the pulley N' in the opposite direction to which the cables *n* are wound on the pulley N.

O' designates a weight which is secured to the end of the lever O and serves to counterbalance the weight of the saw frame and saw.

P designates a vertically movable dog, which is secured in the beam B' of the frame of the machine and is adapted to be lowered to engage a log to hold the same in the proper position to be operated upon by the saw.

Having described the construction of my improved machine, I will now set forth the operation thereof. Power being applied to the fly wheel L, the pitman J will cause the reciprocation of the bar I, which will in turn impart a reciprocatory movement to the saw frame. Owing to the fact that the guide bar D is downwardly curved, it will be apparent that the saw G will be caused to travel in an arc during the reciprocatory movement thereof, the necessary rocking movement of the saw frame to effect such movement being permitted by the configuration of the bore of the sleeves *i'* secured to the extremities of the reciprocatory bar I. The weight of the saw frame serves to at all times hold the saw in engagement with the work, the weight of said frame being partially counterbalanced by the weight O' secured to the end of the lever O. When it is desired to raise the saw from out of engagement with the work the lever O is depressed, which through the cable o will effect the rotation of the shaft M thereby causing the cables n to be wound on the pulley N and elevating the guide bar D and with it the saw frame.

I do not desire to limit myself to the precise form and construction shown in the drawings, as it is obvious that many minor changes might be made thereto without departing from the spirit of the invention.

What I claim is:—

1. In a saw machine, a frame, a horizontally disposed downwardly curved guide bar positioned for vertical movement therein, a saw frame comprising vertically disposed side bars terminating at their upper ends in sleeves loosely embracing said guide bar, a horizontally disposed bar slidably secured to the frame of the machine and having sleeves loosely embracing the side bars of the saw frame, and means for reciprocating said bar.

2. In a saw machine, a frame, a horizontally disposed curved guide bar positioned for vertical movement therein, a saw frame comprising vertically disposed side bars having their upper ends slidably connected with said curved guide bar, a horizontally disposed bar slidably secured to the frame and having sleeves embracing the side bars of the saw frame, said sleeves being fashioned to permit of the angular movement of the side bars of the saw frame incident to their reciprocation on the guide bar, and means for reciprocating said guide bar.

3. In a saw machine, a frame, a pair of vertically disposed bars secured thereto, a horizontally disposed curved guide bar provided at its ends with sleeves loosely embracing said vertically disposed bars, a saw frame comprising a pair of connected side bars terminating at their upper ends in sleeves loosely embracing said guide bar, a horizontally disposed bar slidably secured to the frame of the machine and terminating in sleeves loosely embracing the side bars of the frame, means for reciprocating said bar, and a counterbalance for said guide bar.

In testimony whereof we affix our signatures in presence of two witnesses.

JAMES MATTHEW GALYAN.
JAMES MADISON CHESNUT.

Witnesses:
JAMES W. JACKSON,
ROBERT GILMORE.